United States Patent
Yamaguchi et al.

(10) Patent No.: US 6,661,503 B1
(45) Date of Patent: Dec. 9, 2003

(54) METHOD FOR MANUFACTURING OPTIC TRANSMISSION MODULES AND SYSTEM FOR INSPECTING BIT ERROR RATE CHARACTERS

(75) Inventors: Kazuo Yamaguchi, Yokohama (JP); Takashi Minato, Yokohama (JP); Shinzoo Nishiyama, Yokohama (JP); Atsushi Murata, Yokohama (JP); Naohiko Baba, Yokohama (JP); Tsutomu Yoshiya, Yokohama (JP); Kazumi Kawamoto, Yokohama (JP); Kyouichi Yamamoto, Yokohama (JP); Kazuo Aoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/485,723

(22) PCT Filed: Nov. 20, 1998

(86) PCT No.: PCT/JP98/05247
§ 371 (c)(1),
(2), (4) Date: May 12, 2000

(87) PCT Pub. No.: WO99/27341
PCT Pub. Date: Jun. 3, 1999

(30) Foreign Application Priority Data

Nov. 21, 1997 (JP) .............................................. 9-321629

(51) Int. Cl.⁷ .............................................. G01N 21/00
(52) U.S. Cl. .................................................... 356/73.1
(58) Field of Search ......................... 356/73.1; 359/110, 359/161, 189, 311; 385/1–9; 250/461.2

(56) References Cited

U.S. PATENT DOCUMENTS

| | | | | |
|---|---|---|---|---|
| 5,604,827 A | * | 2/1997 | Yamaguchi | 385/1 |
| 6,008,916 A | * | 12/1999 | Khaleghi | 359/110 |

FOREIGN PATENT DOCUMENTS

JP 01-160237 6/1989

* cited by examiner

*Primary Examiner*—Tu T. Nguyen
(74) *Attorney, Agent, or Firm*—Antonelli, Terry, Stout & Kraus, LLP

(57) ABSTRACT

A method of manufacturing an optic transmission module assures a high reliability for the module by inspecting the character of a low bit error rate (BER) of the module quickly and accurately. The module is employed in an optical communication system (light transmission system) required to cope with information communication systems that are becoming faster and faster in operation and larger and larger in capacity. Also disclosed is a system and a method for inspection of the BER character which uses a rectangular wave pulse as an interference light to calculate a degradation quantity of a signal-to-noise ratio (S/N) on the basis of a simple theory, thereby inspecting the BER character by extrapolating a case in which there is no interference light (S/X=∞ or X=0) with use of a sign error rate theoretical value according to a bit error rate of a light signal measured according to the degradation quantity.

16 Claims, 6 Drawing Sheets

METHOD FOR MANUFACTURING OPTIC TRANSMISSION MODULES AND SYSTEM FOR INSPECTING BIT ERROR RATE CHARACTERS

BACKGROUND OF THE INVENTION

1. Field of the Invention

The present invention relates to a method for manufacturing a transmitter module, a receiver module, etc. employed to compose a light transmission system at a high yield, and inspecting each of those modules for a character of its low bit error rate (BER: a bit error rate of a signal output from a receiver to the number of random patterns of a signal entered to a transmitter or a disagreement rate of a signal pattern output from the receiver to a signal pattern entered to the transmitter) quickly and accurately with respect to a propagated optical power, as well as a system and a method for inspecting those manufactured modules easily, quickly, and accurately. More particularly, the present invention relates to inspection of optic transmission modules employed for composing a light transmission system for such characters as minimum received power sensitivity, dependency of an optical power by rate, propagation penalty, etc., that is, techniques for measuring, inspecting, and testing fast light/electrical signals.

2. Description of Related Art

To measure a character of a bit error rate (BER), which is the first related art technique, an error rate measuring instrument is used in accordance to the object propagation velocity. In this case, the number of errors is counted and the error rate is calculated within a predetermined time of a received signal light both when the transmitter and the receiver are directly connected to each other and when they are connected to each other via a long distance fiber line. It is premised here that both transmitter and receiver are not disturbed by any interference light. Usually, it takes about ten minutes per BER curve to measure a BER character of about $10^{-3}$ to $10^{-12}$. In addition, because such a BER curve must be measured according to the fluctuation of the ambient temperature and the fluctuation of the power supply of the transmission/receiver module, it takes about a few hours to inspect each object module.

Furthermore, because it takes a few hours to several tens of hours to measure a BER character whose order is as low as $10^{-13}$ and $10^{-14}$, it is confirmed that no error occurs in bit error measurements at an optical power, which is a few dBm higher than an optical power when the BER character of $10^{-10}$ is obtained with addition of an interference light employed as one-point data.

The second related art technique is a sinusoidal wave interference method, which is disclosed in the document (Margin Measurements in Optical Amplifier Systems: IE3 PHOTONICS TECHNOLOGY LETTER, VOL.5, NO.3, MARCH 1993). According to this method, both amplitude and BER of a sinusoidal wave signal are used for extrapolating the BER, so that the extrapolation comes to be possible for up to about $10^{-20}$.

The third related art technique is a method for measuring a bit error rate with addition of a noise, thereby calculating and estimating a bit error rate when no degradation is recognized, as disclosed in Japanese Published Unexamined Patent Application No.6-252959. In this method, a relative phase of a demodulated output is identified both before and after a noise is added, thereby calculating the BER.

In recent years, however, it has been demanded to measure a lower bit error rate of $10^{-12}$ or under, since information communication systems are getting faster and faster in operation and larger and larger in capacity so as to meet the requirement of a higher reliability of fast optical communication systems.

The first related art technique, however, has been confronted with problems that it takes a long time to a non-actual extent, as well as a predetermined accuracy cannot be guaranteed for the result.

The second related art technique has also been confronted with problems that a predetermined accuracy cannot be guaranteed in inspection, since a sinusoidal wave signal must be changed in amplitude and modified, thus difficult to be controlled. In addition, it would take more than a thousand year to confirm an extrapolation accuracy and a relative error in the conventional measurement in real time on the level of $10^{-20}$.

The third related art technique has also been confronted with a problem that a predetermined accuracy cannot be guaranteed in inspection, since the identification process is too complicated.

SUMMARY OF THE INVENTION

Under the circumstances, it is an object of the present invention to provide a method for manufacturing optic transmission modules, which can assure a high reliability for each of those optic transmission modules in quick and accurate inspection of the character of its low bit error rate (BER) so as to be employed satisfactorily for an optical communication system (a light transmission system) required to cope with information communication systems that are getting faster and faster in operation and larger and larger in capacity, thereby solving the above related art problems, as well as a system and a method for inspecting the character of such a bit error rate (BER).

It is another object of the present invention to provide a method for manufacturing high quality optic transmission modules at a high yield by quick and accurate inspection each of those optic transmission modules with respect to the character of its low bit error rate (BER) so as to be employed satisfactorily for an optical communication system (light transmission system) required to cope with information communication systems that are getting faster and faster in operation and larger and larger in capacity.

In order to achieve the above objects, the method of the present invention for manufacturing optic transmission modules comprises the processes of;

(A) manufacturing an optic transmission module employed for a light transmission system; and (B) inspecting the optic transmission module manufactured in the manufacturing process for a character of its bit error rate with use of a bit error rate specific inspection system; wherein the bit error rate specific inspection system includes;

signal light transmitting means for generating a light signal according to an electrical signal pattern;

interference light transmitting means for generating an interference light according to a disturbance signal having a rectangular pulse waveform;

a light coupler for mixing the signal light received from the signal light transmitting means optionally with the interference light received from the interference light transmitting means;

optical means for changing the optical power of the mixed light received from the light coupler;

receiving means for converting the mixed light received from the optical means to an electrical signal so as to be identified and regenerated; and calculating means for measuring a bit error rate of the mixed signal regenerated by the receiving means corresponding to the optical power of the mixed light changed by the optical means, thereby calculating a character of a bit error rate of a signal light to its optical power according to this measured bit error rate corresponded to the change of the optical power of the mixed light, then generating a character of a bit error rate when no interference light is detected on the basis of a theoretical character of a bit error rate according to this calculated character of the bit error rate of the signal light to its optical power so as to be inspected.

Furthermore, in order to achieve the above objects, the method of the present invention for:manufacturing optic transmission modules comprises the processes of;

(A) manufacturing an optic transmission module employed for a light transmission system; and (B) inspecting a character of a bit error rate of the optic transmission module manufactured in the manufacturing process with use of a bit error rate specific inspection system; wherein
the bit error rate specific inspection system includes;
signal light transmitting means for generating a light signal according to an electrical signal pattern;
interference light transmitting means for generating an interference light according to a disturbance signal having a rectangular pulse waveform;
a light coupler for mixing the signal light received from the signal light transmitting means optically with the interference light received from the interference light transmitting means;
optical means for setting an (S/X) ratio of an optical power of the signal light to an optical power of the interference light mixed by the light coupler to a predetermined value so as to change the optical power of the mixed light;
receiving means for converting the mixed light received from the optical means to an electrical signal so as to be identified and regenerated; and
calculating means for measuring a bit error rate of the mixed signal regenerated by the receiving means corresponding to a change of the optical power of the mixed light at the optical power ratio (S/X) set by the optical means, thereby calculating a character of a bit error rate of a signal light to its optical power at the optical power ratio (S/X) according to this measured bit error rate corresponded to the change of the optical power of the mixed light at this measured optical power ratio (S/X), then generating a character of a bit error rate when no interference light is detected on the basis of a theoretical character of a bit error rate according to this calculated character of the bit error rate of the signal light to its optical power at the optical power ratio (S/X) so as to be inspected.

Furthermore, the method of the present invention for manufacturing optic transmission modules employed for a light transmission system and provided with a transmitter and a receiver respectively comprises the processes of;

(A) manufacturing an optic transmission module provided with a transmitter and a receiver and employed for the light transmission system; and (B) inspecting the optic transmission module manufactured in the manufacturing process for its bit error rate; wherein the inspection process makes it possible that the transmitter receives a pattern signal and outputs a signal light, which is mixed with a pulse-like interference light into a light signal, then the receiver receives the mixed slight signal and outputs a signal, which is measured, thereby a bit error rate of a pattern of the output signal received from the receiver is found so that a bit error rate of a pattern of the output signal to the pattern input signal is calculated according to the measured bit error rate when no interference light is detected.

Furthermore, the method of the present invention for manufacturing optic transmission modules comprises the processes of;

(A) manufacturing an optic transmission module employed for a light transmission system; and (B) inspecting the optic transmission module for its bit error rate; wherein
the inspection process makes it possible that;
a pattern signal is entered to the transmitter of the optic transmission module;
a signal light output from the transmitter according to an input of the pattern signal is mixed with a pulse-like interference light having a frequency smaller than a signal frequency of the signal light;
the mixed light is entered to the receiver of the optic transmission module via an optical fiber line;
an output signal from the receiver that has received the mixed light is measured, thereby finding a bit error rate of a pattern of the output signal received from the receiver to a pattern signal entered to the receiver, then calculating a bit error rate of an output signal from the receiver to a pattern signal entered to the transmitter when no interference light is detected from the optic transmission module.

Furthermore, the bit error rate specific inspection system of the present invention, which is employed for a light transmission system and composed so as to inspect an object inspection module for a character of its bit error rate, comprising:

signal light transmitting means for generating a light signal according to an electrical signal pattern;

interference light transmitting means for generating an interference light according to a disturbance signal having a rectangular pulse waveform;

a light coupler for mixing the signal light received from the signal light transmitting means optically with the interference light received from the interference light transmitting means;

optical means for changing the optical power of the mixed light received from the light coupler;

receiving means for converting the mixed light received from the optical means to an electrical signal so as to be identified and regenerated; and calculating means for measuring a bit error rate of the mixed signal regenerated by the receiving means corresponding to the optical power of the mixed light changed by the optical means, thereby calculating a character of a bit error rate of a signal light to its optical power according to this measured bit error rate corresponded to the change of the optical power of the mixed light, then generating a character of a bit error rate when no interference light is detected on the basis of a theoretical character of a bit error rate according to this calculated character of the bit error rate of the signal light to its optical power so as to be inspected.

Furthermore, the bit error rate specific inspection system of the present invention, which is employed for a light transmission system and composed so as to inspect an inspection object for a character of its bit error rate, comprising:

signal light transmitting means for generating a light signal according to an electrical signal pattern;

interference light transmitting means for generating an interference light according to a disturbance signal having a rectangular pulse waveform;

a light coupler for mixing the signal light received from the signal light transmitting means with the interference light received from the interference light transmitting means;

optical means for setting an (S/X) ratio of an optical power of the signal light to an optical power of the interference light mixed by the light coupler to a predetermined value so as to change the optical power of the mixed light;

receiving means for converting the mixed light received from the optical means to an electrical signal so as to be identified and regenerated; and calculating means for measuring a bit error rate of the mixed signal regenerated by the receiving means corresponding to a change of the optical power of the mixed light at the optical power ratio (S/X) set by the optical means, thereby calculating a character of a bit error rate of a signal light to its optical power at the optical power ratio (S/X) according to this measured bit error rate corresponded to the change of the optical power of the mixed light at the optical power ratio (S/X), then generating a character of a bit error rate when no interference light is detected on the basis of a theoretical character of a bit error rate according to this calculated character of the bit error rate of the signal light to its optical power at the optical power ratio (S/X) so as to be inspected.

The bit error rate specific inspection system of the present invention for inspecting an optic transmission module employed for a light transmission system for a bit error rate, comprising:

pattern signal generating means for generating a pattern signal to be entered to a transmitter of the optic transmission module;

transmitting means for receiving the pattern signal generated in the pattern signal generating means, thereby generating a first light signal;

pulse-like signal generating means for generating a pulse-like signal;

signal converting means for generating a second light signal from a pulse-like signal generated in the pulse-like signal generating means;

light mixing means for mixing the first light signal with the second light signal, thereby outputting a mixed light;

receiving means for receiving a mixed light output from the light mixing means; and calculating means for receiving a pattern signal generated in the pattern signal generating means and a pattern signal output from the receiving means, thereby finding a bit error rate of a pattern of an output signal from the receiver to a pattern signal entered to a transmitter of the transmitting means, the receiving means, or the optical fiber means, thereby calculating a bit error rate of a pattern of an output signal from the receiver to a pattern signal entered to the transmitter according to the found error bit rate when no interference light is detected from the transmitting means, the receiving means, or the optical fiber means.

Furthermore, the method of the present invention for inspecting an object optic module employed for a light transmission system for a bit error rate comprises the processes of;

(A) generating a light signal from a transmitter;

(B) generating an interference light, which is a digital light signal of a lower frequency than that of the light signal;

(C) mixing the light signal with the interference signal;

(D) attenuating the power of the mixed light signal;

(E) receiving the attenuated light signal at a receiver and measuring a bit error rate of the received signal;

(F) calculating the bit error rate, thereby finding a character of a bit error rate when no interference light is detected (X=0);

(G) comparing the character of this found bit error rate with the character of a reference bit error rate, thereby deciding whether the character is OK or NG; and (H) inspecting the bit error rate of an object optic module.

According to the methods of the present invention as described above, because a rectangular wave pulse is used as an interference light, it is possible to calculate degradation quantity of a simple theoretical signal-noise ratio (SIN). Consequently, a case in which there is no interference light (S/X=∞ or X=0) can be extrapolated from a bit error rate of a measured light signal with use of a theoretical value of a sign bit error rate. In addition, an accurate character can be generated for a low bit error rate (BER) of $10^{-12}$ or under easily according to an optical power ratio between optical powers of a signal light and an interference light (S/X value), thereby enabling inspection of a low bit error rate of $10^{-12}$ or under to be made accurately, easily, and quickly. As a result, the present invention can assure a high reliability for optical communication systems (light transmission systems) required so as to cope with faster and larger capacity information communication systems (which has a capacity of more than 2.4 Gbits/,for example, 10 Gbits/sec and 40 G bits/sec, etc.).

DETAILED DESCRIPTION OF THE PREFERRED EMBODIMENTS

Hereunder, the preferred embodiments of the present invention will be described with reference to the accompanying drawings.

Figure 1A:
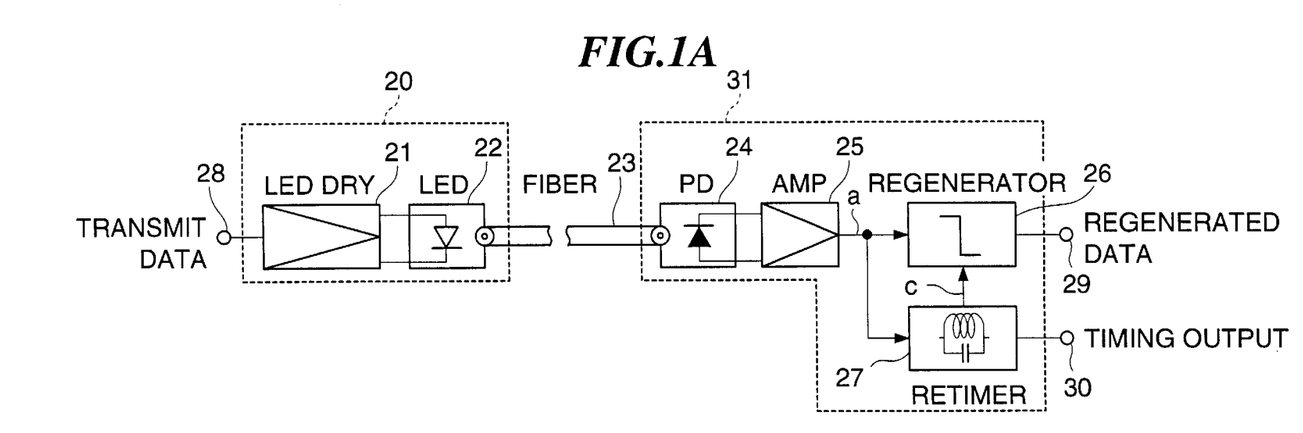
FIG. 1 is a schematic block diagram of a light transmission system of the present invention.
Figure 1B:
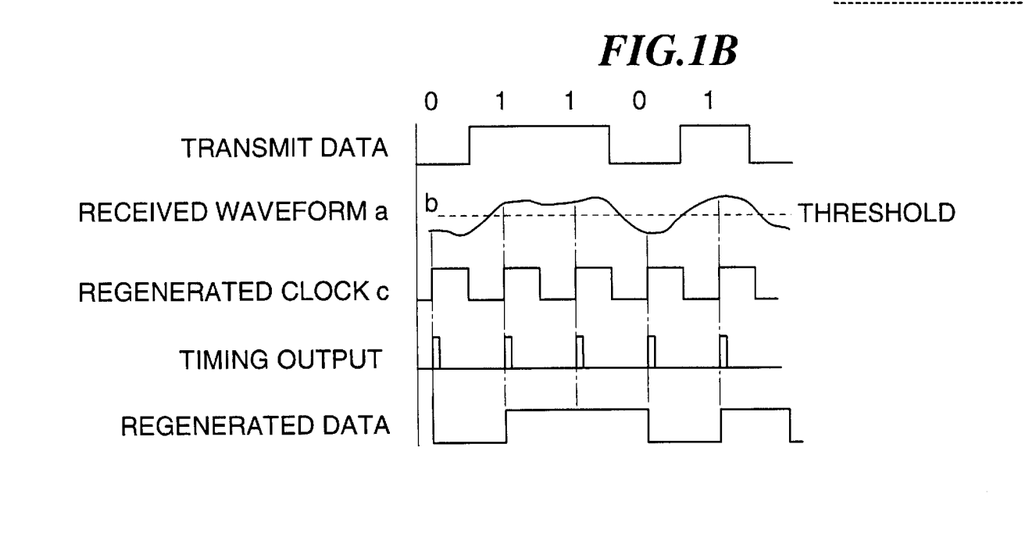

FIG. 1 is a schematic block diagram of a light transmission system comprising a transmitter module for generating a light signal used to inspect a bit error rate (BER: Bit Error Rate), or a receiver module for receiving the optical light signal and converting the signal to an electrical signal so as to be regenerated, or a transmitter and receiver module (hereafter, these two modules will be generically referred to as optic transmission modules). Those optic transmission modules are connected to each other via an optical fiber line.

Concretely, object modules to be inspected with respect to a bit error rate (BER) according to the present invention is a transmitter module, a receiver module, and a light transmission system, in which those optic transmission modules, that is, the transmitter module and the receiver module, are connected to each other via an optical fiber line.

The transmitter module 20 for generating a light signal is composed of a photodiode driver (LED DRV) 21 driven according to transmit data 28, a light emitting diode (LED) 22, etc., which are all mounted on a transmitter module printed board (not illustrated).

The receiver module 31 for converting a received light signal to an electrical signal is composed of such main parts as a photoelectric diode (PD) 24 for receiving a light signal, a receiving amplifier (AMP) 25 for amplifying a signal received and converted by the photoelectric diode 24, a resonance circuit (RETIMER) 27 for sampling a regenerated clock signal c from a pulse string of the received signal amplified equivalently by the receiving amplifier 25 and outputting a timing pulse signal 30, a regenerator 26 for outputting data 29 regenerated on a predetermined threshold level b at a timing pulse according to the clock signal c generated from the received signal (an output voltage of a refined pulse assumed to be a gaussian random variable number) amplified equivalently by the receiving amplifier 25, etc., which are all mounted on the receiver light module printed board (not illustrated).

An optic transmission module is composed of the transmitter module 20 composed of the parts as described above and the receiver module 31 composed of the parts as described above. In the light transmission system, the transmitter module 20 and the receiver module 31 are connected to each other by a long distance optical fiber line 23 via an optical connector respectively. The optical connector of the transmitter side may be mounted on the transmitter optic module board. In the same way, the optical connector of the receiver side may be mounted on the receiver optic module board.

Next, a description will be made for how to inspect a bit error rate (BER) in each of the transmitter module and the receiver module as a single unit, as well as in the entire light transmission system manufactured as described above respectively.

In particular, as a higher reliability is required for the optical communication systems (light transmission systems) more and more so as to cope with information communication systems that are getting faster and faster in operation and larger and larger in capacity (for example, 2.4 Gbits/sec or over), it has been indispensable to inspect a low bit error rate (BER) of $10^{-12}$ or under accurately, easily, and quickly according to fluctuations of both ambient temperature and power supply. In addition, for information communication systems whose capacity is 10 G bits/sec or over, it is also strongly demanded to inspect a low bit error rate (BER) of $10^{-13}$ and $10^{-14}$.

Figure 2:
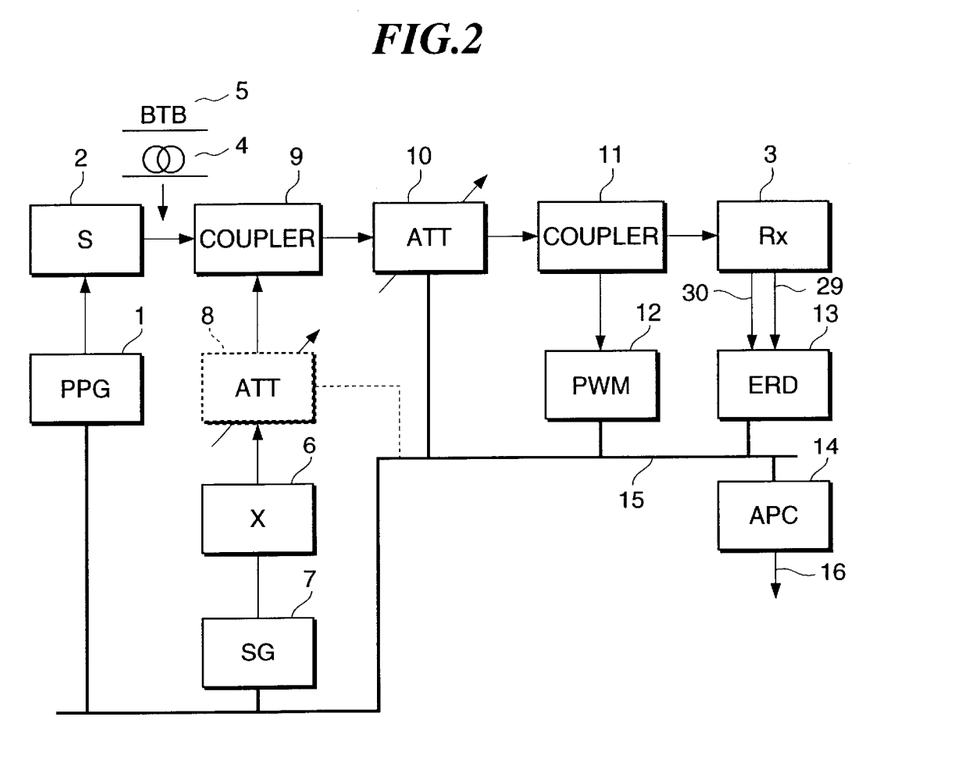
FIG. 2 is a block diagram of a BER specific inspection system for inspecting an error rate (BER) in an embodiment of the present invention.

FIG. 2 shows a block diagram of an embodiment for such an inspection system employed to inspect a bit error rate (BER) according to the present invention.

If either of the transmitter 2 or the receiver 3 is a standard master or a module having a known preferred character, then the other module is inspected. Concretely, if the transmitter (S) 2 is an object for inspection, it is usually inspected both when it is connected to the receiver 3 via a long distance fiber line 4 and when it is connected to the receiver via a direct coupling fiber line (BTB) without use of a long distance fiber line 4. In this case, the fiber line connections between the module and the receiver are exchanged for the inspections carried out in the same inspection system. If the receiver (Rx) is an object for inspection, it is usually inspected with use of a standard transmitter 2 without use of a long distance fiber line 4. To inspect the whole light transmission system, therefore, all of the transmitter (S) 2, the receiver (Rx) 3, and the long distance fiber line 4 are inspected, of course. Because the bit error rate (BER) is inspected in the same procedure in each of those inspection items, a description will be made here only for the inspection of the transmitter 2.

Numeral 1 is a pseudo-random pattern generator (PPG), which generates an NRZ (Non Return Zero) signal at a generation probability of ½ of each of electrical signals (0,1) so as to stabilize the object pulse power. Concretely, the pseudo-random pattern generator 1 generates a constant pseudo-random pattern at a probability of ½ of each of electrical signals (0,1) at a predetermined time cycle T. The transmitter (S) 2 converts the pseudo-random pattern signal generated by the pseudo-random pattern generator 1 to a light signal (E/O conversion) so as to output a signal light, which is then transmitted to the inspection system via a long distance fiber line 4 or a direct coupling fiber line (BTB) 5.

The signal light transmission means comprises the pseudo-random pattern generator (PPG) 1 and the transmitter (S) 2. Numeric 7 is a disturbance pattern generator (SG), which generates a repetitive pulse pattern signal (a disturbance pattern signal consisting of a rectangular waveform pulse having a fixed amplitude) at a velocity (1,0) within about v/100 to v/250, which is slower than the propagation velocity v of the transmitter 2. Numeric 6 is a transmitter (X) for generating a pseudo-random interference light (a noise light). The transmitter (X) converts a disturbance pattern signal consisting of a pulse waveform of a velocity within v/100 to v/250, which is slower than the propagation velocity v of the transmitter 2 to which a disturbance pattern signal is entered from the disturbance pattern generator 7. The interference light transmission means comprises the disturbance pattern generator (SG) 7 and the transmitter (X) 6. Numeral 8 is a light attenuator (ATT), which adjusts the strength of an interference light output power (dB) received from the transmitter 6.

If the signal light output from the transmitter 2 and the interference light output from the transmitter 6 are used at a fixed ratio therebetween, the light attenuator 8 is omissible. Numeral 9 is a light coupler (COUPLER), which mixes the signal light output from the transmitter 2 with the interference light output from the transmitter 6 at a certain power rate (for example, there are 50:50, 9:1, or 8:2 for the power ratio (mixing ratio). Numeral 10 is a light attenuator (ATT) used to change an optical power. It adjusts an optical power of only a signal light (S) and an optical power of only an interference light (X). Numeral 11 is a light coupler (COUPLER), which branches a signal into an optical power meter 12 and a receiver 3 at a fixed rate (for example, there are 50:50, 9:1, or 8:2 for the power ratio (branching ratio). The optical power meter 12 monitors a light signal consisting of a signal light (S) and an interference light (X) in the object transmission line. Numeral 12 is an optical power meter (PWM), which measures an optical power of only a signal light branched by the light coupler 11, as well as an optical power of only an interference light (X), or a mixed power of both S and X lights. The optical power meter (PWM) also displays measured values.

The receiver (Rx) 3 used as a receiving means converts a mixed light to an electric signal (O/E conversion). The converted signal is amplified equivalently by a receiving amplifier (AMP) 25 so that its waveform is refined. After that, the resonance circuit (RETIMER) 27 generates a regenerated clock c, thereby retiming the signal. In the receiver (Rx) 3, the regenerator 26 regenerates a signal from a received signal a (an output voltage of a refined pulse assumed to be a gaussian random variable number) amplified equivalently in the receiving amplifier 25 on a predetermined threshold level b at a timing pulse according to the clock signal c for regeneration, thereby outputting a timing signal 30 according to the regenerated clock c. In the identifying process in the receiver 3, a threshold b on a certain fixed level is compared with an input signal a, thereby the signal is regenerated as a pulse signal (regenerated data) 29 whose value is 0 or 1. There are two types of the receiver 3; one type receiver 3 has a variable threshold b and the other has a fixed threshold.

Numeral 13 is an error detector (ERD) composed mainly of a CPU. This error detector (ERD) 13 compares an object signal with an optical power adjusted in the light attenuator 10 synchronously with a pattern output from the pseudo-random pattern generator 1 according to the timing signal 30, thereby counting the number of errors occurred within a time T determined by both of an obtained error rate (the number of errors n/the number of given patterns N) and a propagation velocity v, as well as the relationship among the related items in the (expression 2) shown below so as to calculate the object bit error rate (BER). Concretely, a bit error rate (BER) is calculated in the error detector (ERD) 13 from the relationship among the related items in the following (expression 1).

$BER$=(the number of errors $n$ to occur with respect to a signal (1,0) within a measuring time $T$)/(the number of patterns $N$ of a signal (1,0) within a measuring time $T$)=(the number of errors $n$(bits))/[(propagation velocity $v$(bits/s) of a signal (1,0))×(measuring time $T$(s))]      (Expression 1)

$T=n/(BER \times v)$      (Expression 2)

Both pseudo-random pattern generator 1 and error detector (ERD) 13 may be housed in the same unit.

Numeral 14 is an extrapolated operation means (APC) composed mainly of a CPU and a memory (storage). The APC 14 extrapolates a BER curve (BER character) according to a curve of an S/X error rate measured by the error detector 13 and the theoretical S/X stress character. The APC 14 also controls the light attenuator (ATT) 10, the optical power meter (PWN) 12, the pseudo-random pattern generator 1, the disturbance pattern generator (SG) 7, and the error detector (ERD) 13 via a bus 15 respectively. Furthermore, the APC 14 analyzes the inspection result of the BER character outputted from ERD 13 and feeds back the result to the previous process. Both of the error detector (ERD) 13 and the extrapolated operation means 14 may share one CPU.

Next, a description will be made for the operation of the whole inspection system shown in FIG. 2. In this case, the transmitter 2 is to be inspected. Concretely, the signal from the pseudo-random pattern generator 1 is converted to an on-off signal of a laser light in the transmitter 2, output to a transmission system. At this time, the transmitter 2 is inspected both when it is connected to the receiver 3 via a long distance fiber line 4 and when connected via a direct-coupling fiber line (BTB) by exchanging the fiber lines for the inspections executed in the same inspection system.

To apply an interference light to a light signal output from the transmitter 2 in this inspection, an electrical signal consisting of a rectangular wave pulse (a repetitive pulse pattern (1, 0)) having a fixed amplitude is output from the disturbance pattern generator 7 to the transmitter 6 at a velocity within v/100 to v/250, which is slower than the propagation velocity of the transmitter 2. This electrical signal consisting of a rectangular wave pulse and having a fixed amplitude is converted to a light in the transmitter 6, then output as an interference light. The light coupler 9 mixes this interference light with a signal light received from the transmitter 2 at a fixed rate. In addition, the light attenuator 8 adjusts the strength of the output power (dB) of the interference light automatically or manually according to the control signal received via the bus 15.

When using a signal light and an interference light with a constant mixing ratio, the power of the mixed light at the light attenuator 10 can be controlled automatically or manually by the light attenuator 8 according to the control signal received from the bus 15. In addition, the power of only the signal light can be measured with use of an optical power meter 12 separately from the power of only the interference light so as to confirm the ratio between those lights. It is thus possible to omit the light attenuator 8 at the interference light side. Of course, the optical power meter 12 can also measures the power of the mixed light.

The light coupler 11 branches a light signal to the optical power meter 12 and the receiver 3 at a fixed rate. The optical power meter 12 monitors a light signal consisting of a signal light and an interference light in a transmission line. At this time, the optical power meter 12 is composed so as to display the optical power of the transmission line. In the receiver 3, a mixed light, which is an optical light signal, is converted to an electrical signal (O/E conversion), refines the waveform of the signal, retimes the signal, and regenerates the signal as an electric signal (1,0). At this time, an input signal a is compared with a fixed level threshold b to identify the object signal. The signal is regenerated as a 0 or 1 pulse signal (regenerated data) 29. This signal is compared in the error detector 13 with the optical power adjusted in the light attenuator 10 synchronously with a pattern output from the pseudo-random pattern generator 1 according to the timing signal 29, then the number of errors is counted for the object signal within a time determined by both of the received bit error rate (BER) and the propagation velocity v, thereby calculating the object bit error rate (BER), then output to the extrapolated operation means 14 via the bus 15.

A laser light used for both of the transmitters 2 and 6 has the same wavelength (for example., a 0.5 um for a long distance and 1.3 um for a short distance).

If the receiver is to be inspected, a noise light (excited light) from an optical fiber amplifier is applied with use of another coupler (not illustrated) together with an interference light (X light) from the transmitter 6 in some cases.

Next, a description will be made in detail for how to make an extrapolation in the extrapolated operation means 14.

Figure 3A:
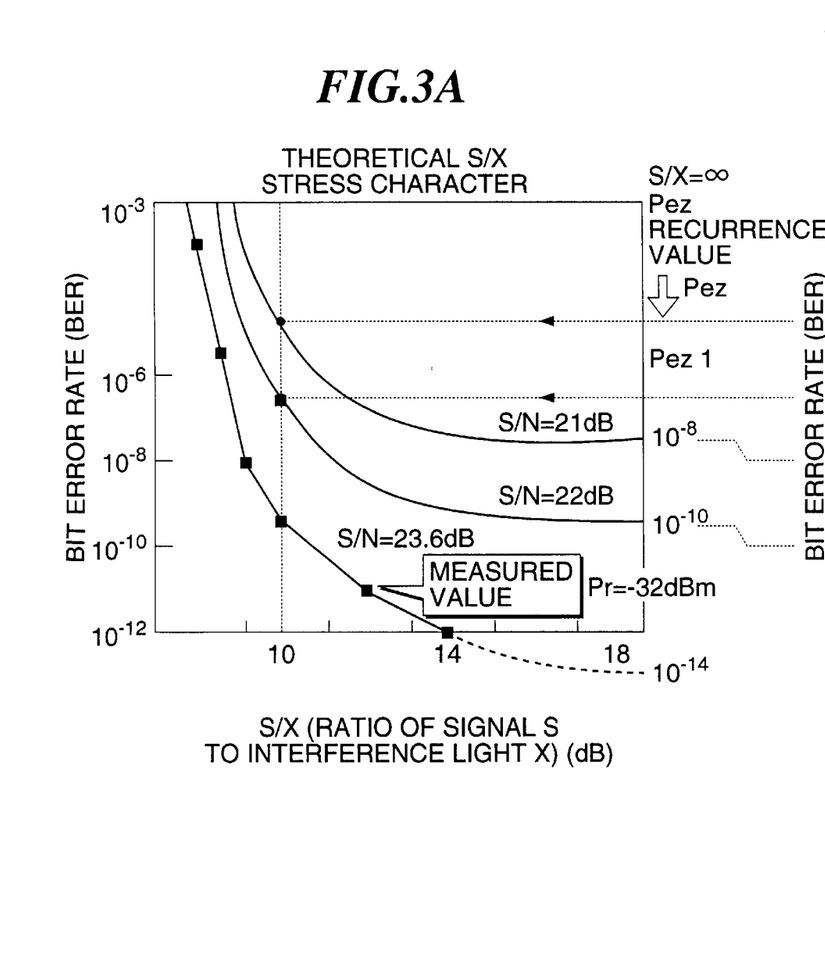
FIG. 3 shows charts for describing the first extrapolation executed in an extrapolated operation means shown in FIG. 2.

At first, the first extrapolation for extrapolating a BER curve (BER character) will be described with reference to FIG. 3. The theoretical S/X stress character shown in FIG. 3(a) is found by the CPU provided beforehand in the extrapolated operation means or another CPU provided separately from that one with use of the following theoretical expression (expression 3). When the CPU, which is different from that in the extrapolated operation means 14, is used to find the theoretical S/X stress character, then this found theoretical S/X stress character must be entered to the extrapolated operation means 14, then stored in such a storage as an internal memory.

$$BER = f((S/N)-D) = Q(\tfrac{1}{2} \cdot (10^{(((S/N)-D)/20)})), \quad \text{(Expression 3)}$$

where S/N represents the signal-to-noise ratio of S representing the signal components of the detected light signal and N representing noise components of the detected light, and D representing a S/N degradation quantity and being defined in conjunction with (Expression 8) ahead.

In the (expression 3), the function Q(x) is an upper probability of normal distribution. Generally, the output voltage (received waveform a shown in FIG. 1) of received continuous refined pulses amplified equivalently in the amplifier 25 provided in the receiver 3 (normal pulse (0,1) which is a unipole signal in this case), when there is no interference light (X light), is assumed to be a gaussian random variable number and regenerated on a predetermined threshold level b sampled from a pulse string of the received signal according to a clock signal c for regeneration in the regenerator 26 provided in the receiver 3. If this threshold level b is assumed to be ½ of the signal amplitude, the BER value has the relationship among the related items as shown in (expression 4).

$$BER = (\tfrac{1}{2}) \mathrm{erfc}(q/\sqrt{2}) = Q(q), \quad \text{(Expression 4)}$$

where q is defined in (Expression 6) ahead.

$$\mathrm{erfc}(x) = 1 - \mathrm{erf}(x) \quad \text{(Expression 5)}$$

The function Q(q) is an upper probability of normal distribution. The 2q has the relationship among the related items as shown in (expression 6).

$$2q = A/\sqrt{N} \quad \text{(Expression 6)}$$

However, A is a signal amplitude peak-to-peak value and √N is an average noise amplitude. In addition, (S/N) is represented by the following (expression 7) when displayed in decibels.

$$(S/N) = 20 \log(2q)(dB) \quad \text{(Expression 7)}$$

Therefore, if BER is represented as a function of (S/N) according to the relationship between the (expression 4) and the (expression 7), the bit error rate (BER) comes to have the relationship among the related items as shown in the following (expression 8).

$$BER = Q((\tfrac{1}{2}) \cdot 10^{(S/N)/20}) \quad \text{(Expression 8)}$$

A theoretical S/N stress character is represented as the above (Expression 3) in which S/N degradation quantity D is subtracted from the item of (S/N). The S/N Degradation quantity D is obtained by mixing an interference light (x) with a signal light by the light coupler 9. And the signal light is a signal in a theoretical expression of a sign error rate when a Gaussian distribution noise N is piled up in the theoretical expression of a sign error rate (a sign error rate theoretical expression when there is no interference light) represented as the above (Expression 8) when there is no interference light (X).

The S/N degradation quantity D caused by an interference light (X) is measured with an inverse number Log of the eye opened ratio of an eye pattern and represented by the following relationship among the related items in the (expression 9). The eye opened ratio of the eye pattern is represented by a ratio E/V of the inside eye opened width (inside pupil width) E to the eye opened width (outside pupil width) of the whole eye pattern.

$$D = 20 \log(V/E)(dB) \quad \text{(Expression 9)}$$

According to the signal amplitude level of the eye pattern, the ratio of V to E comes to be as shown in the (expression 10) and the ratio of S to X comes to be as shown in the (expression 11).

$$V = S+X \quad E = S-X \quad \text{(Expression 10)}$$

$$(S/X)E = 10 \log(S/N) \quad \text{(Expression 11)}$$

Consequently, the S/N degradation quantity D caused by a generated interference light (X) can be expressed as a function of (S/X)E by the following (expression 12) which is derived from the (expression 9) through the (expression 11).

$$D(S/X) = 20 \log \frac{10^{\frac{(S/X)E}{10}} + 1}{10^{\frac{(S/X)E}{10}} - 1} (dB) \quad \text{(Expression 12)}$$

In this (expression 12), (S/N)E is a decibel value of the S/N ratio.

The theoretical S/N stress character shown in FIG. 3(a) is obtained by calculating the character of a bit error rate to SIX with use of the S/N value as a parameter in both (expression 3) and (expression 12). When the value of X (which means the value of the interference light mentioned after (Expression 11)) is zero, the value of N/X is infinite, and from Expression 12, D(SIX) becomes zero, and then Expression 3 is described as BER(S/X=∞)=Q((½)·(10^((S/N)/20)))=Pez. This theoretical S/X stress character agrees to the measured S/N stress character at Pr=−32 dBm and at S/N= 23.6 dB. (See the ∪ marked black curve shown in FIG. 3(a).)

As described above, it is confirmed that the theoretical S/X stress character found by the (expression 3) agrees to the measured S/N stress character. The S/X stress character indicates the relationship between an S/X (a power ratio of the signal light (S) to the interference light (X)) (dB) and a bit error rate (BER).

Figure 3B:
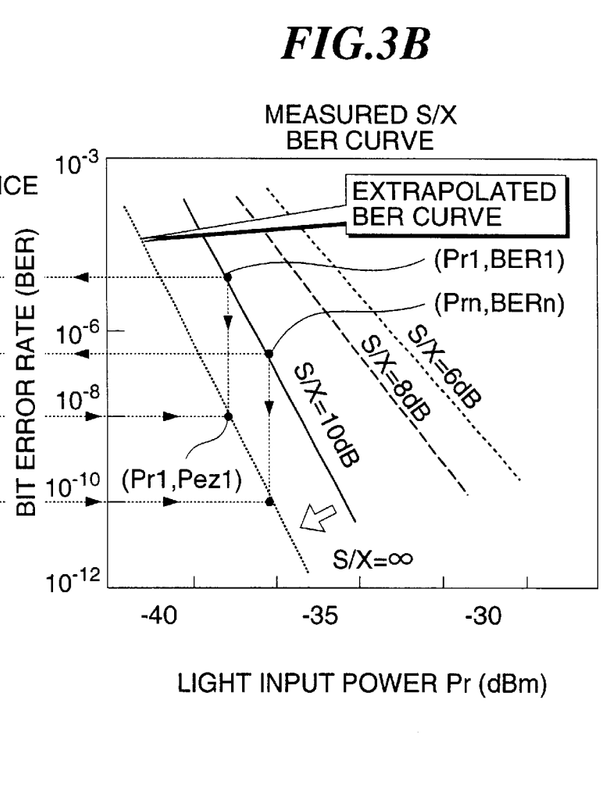

FIG. 3(b) shows a measured value curve (a solid line, S/X=100 dB) of a bit error rate obtained by the error detector (ERD) 13 with respect to the power Pr of the signal light with use of an S/X parameter entered to the extrapolated operation means (APC) via the bus 15 after the measurement with addition of an interference light (X). The power Pr of the input light represented on the horizontal axis is represented as an optical power of a signal light(S) on the normal BER curve (BER character), the Pr is described as a value obtained by subtracting the power of the interference light (X) from the power Pin of the light measured by the optical power meter (PWM) 12 with application of an interference value (X) and inputted through the bus 15. Concretely, the value of the optical power Pin, when measured with addition of an interference light (X) in the optical power meter 12, is also included in the interference light (X). The power Pr of the signal light at this time is thus calculated by subtracting ΔPr like Pr=Pin−ΔPr. This is because the horizontal axis Pr of a BER character must match the display of an optical power of the signal light(S).

The difference ΔPr is calculated at the extrapolated operation means (APC) 14 by using the expression 13, and ΔPr is the difference between the optical power value Pin and the signal light S, wherein, Pin corresponds to the optical power value measured by the optical power meter 12 when an interference light (X) is applied and transferred to the APC 14 via the bus 15, and S corresponds to optical power value of the signal light when no interference light X is applied and transferred to the APC 14 via the bus 15. The value of S/X, the ratio between the signal light S and the interference light X and used at the APC 14 in the calculation of the Expression 13, is controlled by the light attenuator (ATT) 10.

$$\Delta Pr = 10\log\left(1 + 10^{\frac{(S/X)E}{10}}\right)(dB) \qquad \text{(Expression 13)}$$

This (expression 13) is obtained from the following relationship among the related items.

ΔPr=10 Log[(converted optical power mW of S at some value of S/X)+(converted optical power mW of X at some value of S/X)−(converted optical power mW of X when S/X is infinite)+(converted optical power mW of X when S/X is infinite)]

=10 Log[$10^{S/10}+10^{(S-(S/X)E/10)}$]

=10 Log(1+($10^{(-(S/X)E/10)}$))(dB).

For example, at S/X=10(dB), the power Pr of the S light is smaller than Pin by ΔPr=0.414(dB). In which, ΔPr is calculated from the (expression 13), and Pin is a value (a total power of both S and X lights) measured by the optical power meter 12 and inputted through the bus 15.

At S/X=8(dB) and at S/X=6(dB), it can be displayed on the Pr axis with use of the value calculated in the (expression 13) in the same way.

To set S/X=10(dB), the X light is turned off while there is only the signal light S, then the optical power is set to −30 (dBm) in the light attenuator 10. Then, the signal light is turned off so as to enter only the X light and adjust the light attenuator so as to set the optical power to −40 (dBm).

After the above operation, by inputting both S and X lights simultaneously, and varying the received optical power Pr by the light attenuator 10, the optical power (S/N) can be varied at a fixed rate (for example, at S/X=10 dB in this embodiment).

Next, a description will be made for an extrapolation, for example, (at A(dB)=10(dB)) in the extrapolated operation means 14. The extrapolated operation means 14 calculates an S/N value from both of the data at a measuring point (Pr1,BER1) on a calculated S/X error rate measurement curve and the value of S/X=A(dB) (for example, A(dB)=10 (dB)) with use of the (expression 14) obtained from the relationship between the (expression 3) and the (expression 12), then finds an recurrence bit error rate BER=Pez at S/X=W(D=0) from the S/N at that time with use of the (expression 3) or (expression 8). This value indicates a BER when there is no X light.

$$S/N=20 \ Log\{2Q^{-1}(BER)\}+D(S/X)(dB) \qquad \text{(Expression 14)}$$

In the (expression 14), .the function $Q^{-1}$(BER) is an inverse one of normal cumulative distribution.

In the extrapolated operation means 14, S/N value is calculated and an extrapolation point on the S/X error rate measured curve can be obtained. For example, from the S/X stress theoretical character determined and stored in the memory (storage) beforehand, as shown in FIG. 3(*a*), S/N= 21(dB) is calculated by using the BER1 value and the S/X=10(dB) value. Then, Pez=$10^{-8}$ as an recurrence bit error rate (BER) at S/N=∞(D=0) can be known from FIG. 3(*a*) and as a result, a (Pr1, Pez1), which is a point of the extrapolated BER curve (extrapolated BER character) on the S/X error rate measured curve shown in FIG. 3(*b*) can be obtained.

Pr1 is a power value converted from the signal light S, which is a measured value of an S/X error rate. Pez1 is an recurrence error rate of the S/X stress theoretical character at S/X=∞(X=0). Then, the extrapolated operation means 14 also calculates the N set (Prn, BERn of measuring points on the S/X error rate measured curve in the same way, thereby the means 14 can generate one extrapolated BER curve (extrapolated BER character).

As a result, the extrapolated operation means 14 can extrapolate the BER of Pez≈$10^{-10}$ in measurements for up to about BER=$10^{-7}$ with use of the error detector 13 at S/X= 10(dB). In addition, if an extrapolated BER curve (extrapolated BER character) is found for up to $10^{-12}$ in the extrapolated operation means 14, then the error detector 13 can measure the BER curve with addition of S/X of $10^{-9}$ in maximum instead of the extrapolated operation means 14.

As described above, the smaller the S/X=A(dB) value becomes, the higher the BER value used for extrapolation becomes. The measuring time can thus be reduced significantly. The measuring time is getting longer for lower bits. For example, it will become 10 times per error rate digit. If the propagation velocity of the transmitter/receiver is 2.4 Gb/s, it will take about 7 minutes for measuring a bit error rate at one point of $10^{-12}$ if the (expression 2) is used. The relative error between the measured BER curve and the extrapolated BER curve becomes about 1 dB to 0.1 dB on the Pr axis according to the value of S/X=A(dB). The smaller the S/X value is, the larger the error becomes. The most suitable value is found for the S/X by means of trading-off of both necessary accuracy and measuring time.

Although the S/X is fixed in the extrapolation method described above, a plurality of S/X values can be combined to generate one BER curve, for example, extrapolating a BER curve with use of, for example, S/X=A, B(dB), A>B, and other conditions, in the extrapolated operation means 14. Accordingly, the measuring time can be reduced and the accuracy can be improved. In addition, if the linearity (slopeΔBER/ΔPr) when in extrapolation at each point is checked and a displacement (ΔPr, Δpe, etc.) from every point on a line is checked with use of the least square method in the extrapolated operation means 14, it is possible to inspect a bad curve character. It is also possible to inspect a bad floor character, a bad curve character, etc. regardless of the Pr value in the same way. In this case, each of which takes a fixed BER respectively.

Figure 6:
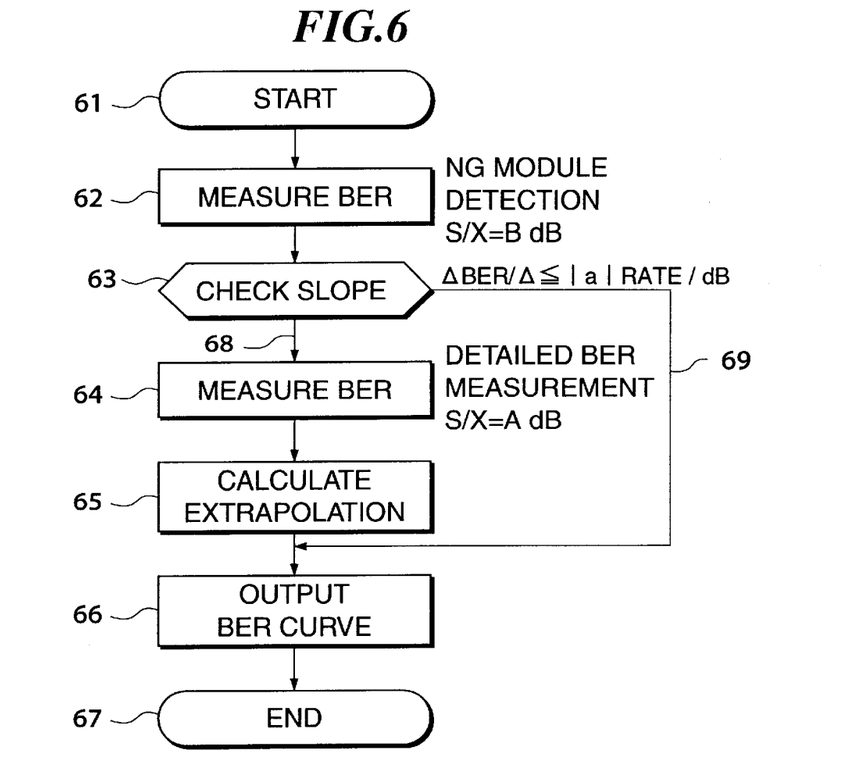
FIG. 6 shows a procedure for inspecting a BER by changing the S/X value according to the present invention.

Concretely, the extrapolated operation means 14 sets S/X=B(dB) (however, if B is set to a value within 6(dB) and 10(dB) in step 61, the error detector (ERD) 13 can measure a BER quickly within a range of $10^{-5}$ to $10^{-8}$) for the light attenuator (ATT) 10, etc. via the bus 15, thereby the error detector (ERD) 13 can start measurement and calculation of the BER. Next, the extrapolated operation means 14 can determine in step 62 that the object transmitter, the receiver, or the light transmission system is defective (defective/non-defective determination for the minimum received power sensitivity) according to the error rate (BER) measured and calculated quickly at S/N=B(dB) in the error detector (ERD)

13, then entered to the inspection system if the entered error rate (BER) is, for example, about $10^{-5}$ to $10^{-8}$, which is far larger than the target value (for example, $10^{-12}$). Concretely, defective modules whose error rate (BER) values are significantly higher than the target value can be selected and inspected quickly.

Next, the extrapolated operation means 14 calculates the linearity (slope$\Delta$BER/$\Delta$Pr) between two points on one BER curve to be measured and calculated quickly at S/X=B(dB) by the error detector (ERD) 13, then entered to the inspection system. The extrapolated operation means 14 checks whether this linearity satisfies the target value ($\Delta$BER/$\Delta$Pr$\leq$|a| rate/dB) in step 63. If the target value is not satisfied, the extrapolated operation means 14 outputs the inspection result 16 in step 66, thereby inspections of a bad curve character, etc. are enabled. After that, the extrapolated operation means 14 sets S/X=A(dB) (however, A is the most suitable value) for the light attenuator (ATT) 10, etc. via the bus 15 so as to measure the BER in detail, thereby the error detector (ERD) 13 can measure and calculate the BER.

After that, the extrapolated operation means 14 extrapolates a measured curve of an S/X error rate measured by and entered from the error detector (ERD) 13 in step 65 according to the S/X stress theoretical character found and stored in the storage (memory) beforehand. The extrapolated operation means 14 calculates the extrapolated BER curve (extrapolated BER character) in step 66 (inspection of a lower bit error rate (BER) of $10^{-12}$ or under at S/X=$\infty$ according to the fluctuation of each of the ambient temperature and the power supply of the transmitter, the receiver, or the light transmission system). Then, the extrapolated operation means 14 outputs the result 16, then exiting the inspection in step 67.

Next, a description will be made for the second extrapolation method for extrapolating a BER curve (BER character) with reference to FIG. 4.

In the first extrapolation method described above, the measured value (Pr1, BER1) of an S/X error rate curve is used to find the S/N value of the BER1 as shown in the (expression 14) with use of the optical power Pr1 assumed at the measurement time as is, then an recurrence theoretical value Pez1 for the S/N is calculated when this interference light is not recognized. The following (expression 15) is used for this calculation and (Pr1, Pez1) is assumed as an extrapolated point.

$$BER(S/X=\infty)=Q((\tfrac{1}{2})\cdot(10^{((S/N)/20)}))=Pez1 \qquad \text{(Expression 15)}$$

On the other hand, the second extrapolation method is a method which decides an extrapolated point (Pr', Pez) of a BER curve according to the (Pr', Pet) with no use of the S/N value. In this case, without calculating the inverse function $Q^{-1}$(BER) of normal cumulative distribution in the (expression 4), the extrapolated point of a BER curve is determined from the extrapolated point (Pr',Pez) which is extracted from (Pr', Pet). And Pr' of each Pet is derived from the interpolation on the S/X error rate curve by using the S/X stress theoretical character value estimated accurately beforehand as shown in FIG. 4(a) from at least two points on the BER curve corresponding to the Pr' (dBm) at S/X=A(dB) which is calculated through measurement as shown in FIG. 4(b) and Pez value at S/X=$\infty$.

Figure 4A:
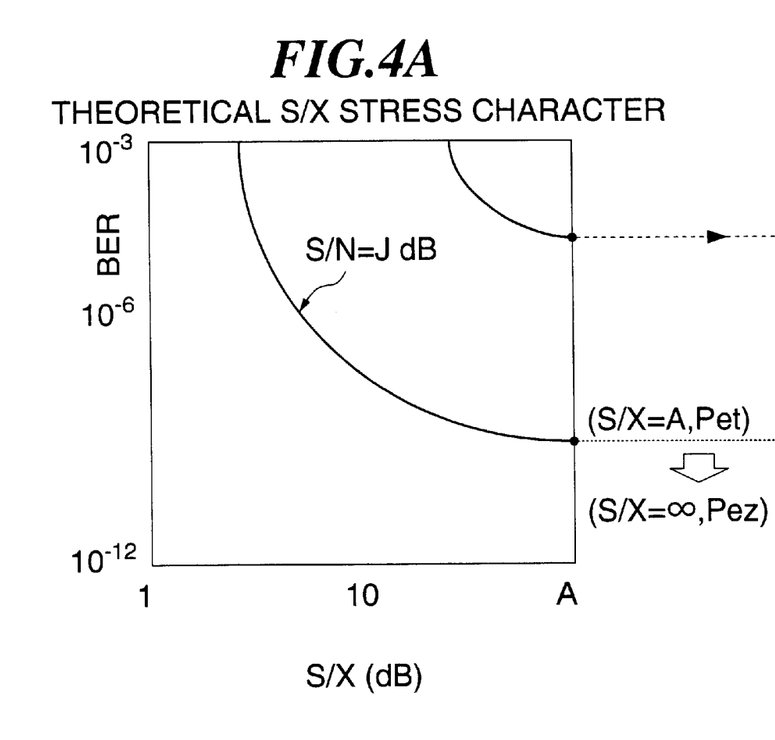
FIG. 4 shows charts for describing the second extrapolation executed in the extrapolated operation means shown in FIG. 2.

In other words, in the S/X stress theoretical character shown in FIG. 4(a), deciding S/X=A(dB) and selecting an optional value J(dB) as an S/N value, Pet can be calculated as BER at S/X=A(dB). In addition, Pez can be calculated as BER at S/X=$\infty$.

Figure 4B:
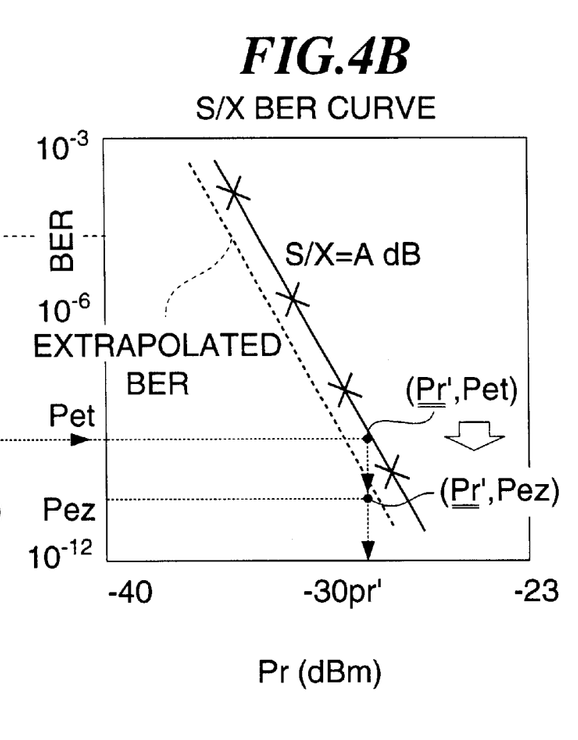

Furthermore, the Pr', which indicates the Pet value calculated from the theoretical character, can be calculated from an interpolation by using data of at least two points (x-marked in FIG. 4) on the BER curve of the Pr(dBm) at S/X=A calculated through measurement as shown in FIG. 4(b). An extrapolated point (Pr', Pez) can be decided from both of this found Pr' and the Pez calculated from the theoretical character.

This is also true for the (Pet)n calculated from another S/N selected freely. The extrapolated BER curve can be drawn at the next point by finding the Pr'. In the same way, the Pr' at both starting and ending points of the extrapolated BER curve can be found from an extended portion of the extrapolated BER curve before and after each of the starting and ending points by means of interpolation, etc. The same extrapolation is also possible from a line drawn according to the slope of a line between two extrapolated points and the average value of the points (each point where the object line crosses the Y or X axis at X or Y=0) of the line.

As described above, in the second extrapolation method, it can omit to calculate the inverse function $Q^{-1}$ (BER) of normal cumulative distribution, the calculating operation is simple, thereby a characteristic curve at the BER points, which are constant having clear ends, can be estimated only by the interpolation regardless of the transmitter or the receiver of the inspection object.

For a character curve of the high linearity for non-defective products, the error can be reduced more in low-order BER calculation.

Next, a description will be made for the third extrapolation method for extrapolating a BER curve (BER character) with reference to FIG. 5. According to this third extrapolation method, as shown in FIGS. 5(a) and (b), scale conversion is employed to decide an recurrence error rate theoretical value (Pez value) of an S/X stress theoretical character (parameter S/N) at S/X=$\infty$ to which the error rate (Pe)n of a measured SIX stress character (parameter Pr) is to recur, thereby an extrapolated BER curve is plotted from this calculated Pez value and the Pr as shown in FIG. 5(c).

Figure 5A:
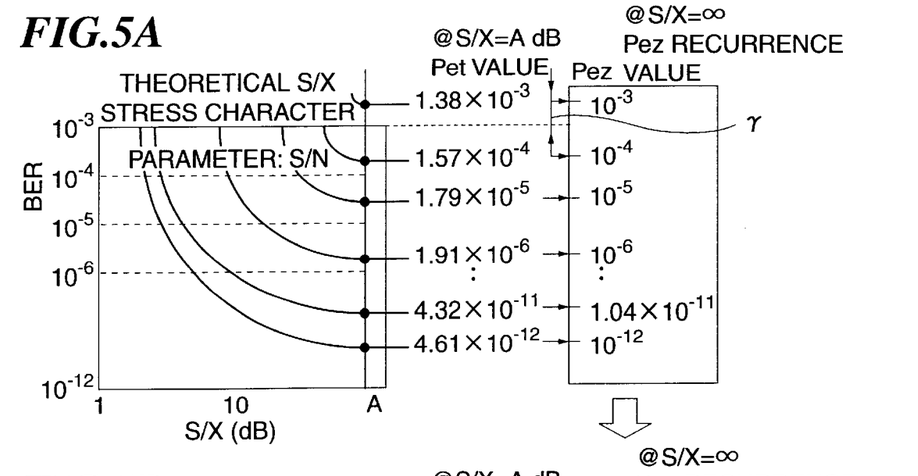
FIG. 5 shows charts for describing the third extrapolation executed in the extrapolated operation means shown in FIG. 2.
Figure 5B:
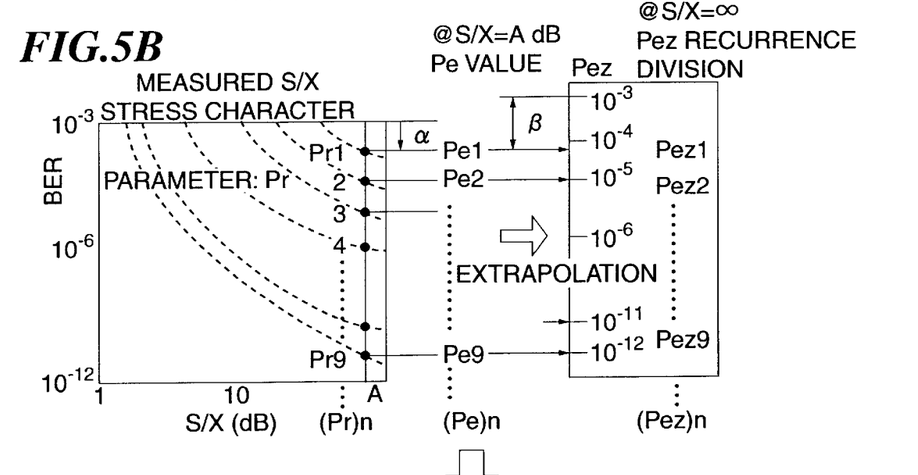

In FIG. 5(a), $\tau$ indicates a difference of displacement between the $10^{-3}$ division of the BER value for the S/X stress theoretical character (a theoretical character of the BER value for S/X(dB) obtained with use of S/N as a parameter) and the $10^{-3}$ division of a Pez recurrence value at S/X=$\infty$. This value is calculated as $|\tau|=|\text{Log}(-\text{Log}1.38*10^{-3})-\text{Log}(-\text{Log}10^{-3})|=0.0205$ at S/X=A(dB). As shown in FIG. 5(b), displacement $\alpha$ (Log Pe) from a measured value BER(Pe)n at S/X=A(dB) on the Pe axis is calculated with respect to the measured S/X stress character (measured character of a BER value for S/X(dB) with use of Pr as a parameter). Then, displacement $\beta(=\alpha+\tau)$ at the division of an error rate recurrence theoretical value Pez is calculated at S/X=A(dB) of an S/X stress theoretical curve.

Figure 5C:
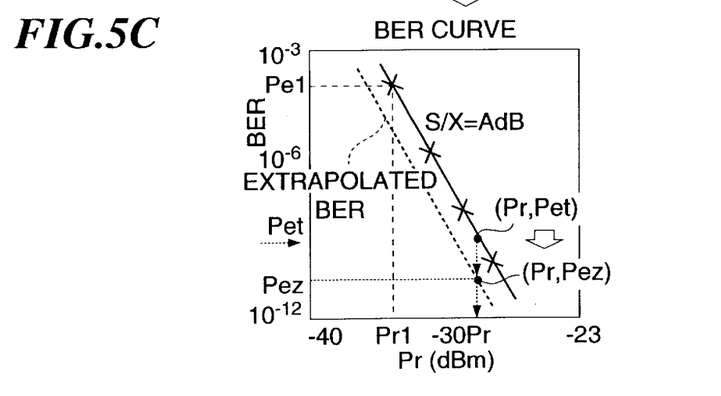

Next, (Pez)n is calculated for this displacement $\beta$, then a coordinate point is found for this (Pr, Pez)n, thereby obtaining an extrapolated BER curve as shown in FIG. 5(c). According to this third extrapolation method, a converted value $\tau$ is fixed for each Pe as described above. Even for $10^{-4}$, each converted value $\tau$ is also calculated according to the relationship between Pet and Pez shown in FIG. 5(a), then this converted value $\tau$ is employed for scale conversion, thereby the inspection accuracy can be improved more. In addition, this third extrapolation method is suitable for extrapolation of floor curves, since the measured Pr value itself is used in principle.

Figure 7:
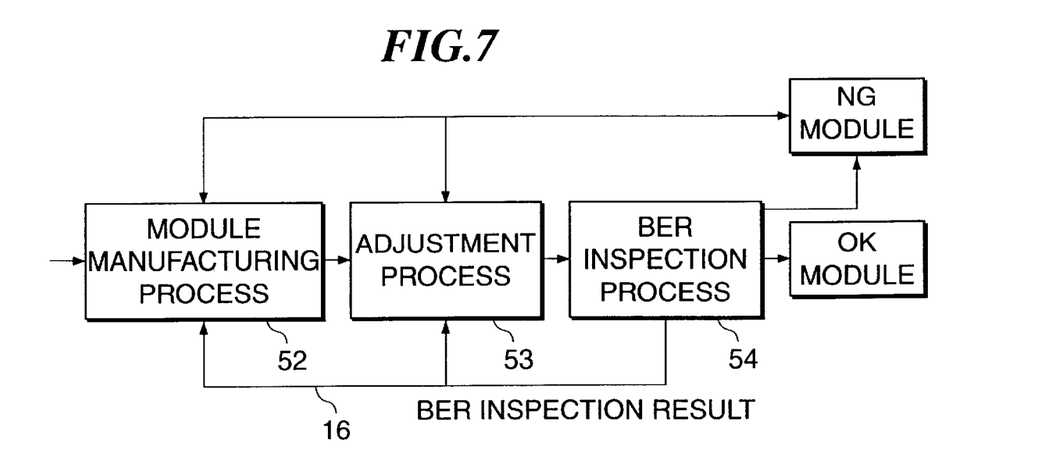
FIG. 7 is a schematic block diagram of a manufacturing method of optic transmission modules employed for composing a light transmission system, according to the present invention.

Next, a description will be made for a method for manufacturing an optic transmission module with reference to FIG. 7.

The optic transmission module employed as a transmitter for generating a light signal shown in FIG. 1 is mainly composed of a photoelectric diode driver (LED DRV) 21 driven according to transmit data 28 and a light emitting diode (LED) 22, both are mounted on a transmitter light module printed board (not illustrated). The optic transmission module is adjusted for transmission electrical character, optical character, etc. in the adjusting process 53. After that, the module is subjected to an inspection process 54, where the BER inspection, etc. are applied to the module with use of a BER specific inspection system shown in FIG. 2. Inspected modules are classified into non-defective and defective modules. In order to select defective modules quickly in this inspection process 54, each module is subjected to a BER measurement at S/X=B(dB) as shown in steps 62 in FIG. 6.

The optic transmission module employed as the receiver 31 for regenerating an electric signal by converting a received light signal as shown in FIG. 1 is mainly composed of a photoelectric diode (PD) 24 for receiving a light signal, a receiving amplifier (AMP) 25, a resonance circuit (RETIMER) 27, and a regenerator 26, which are all mounted on a receiver light module printed board (not illustrated) in the module manufacturing process 52. The modules are adjusted for optical character, electrical character, etc. for receiving, then subjected to a BER inspection so as to be classified into non-defective ones and defective ones with use of a BER specific inspection system in the inspection process 54.

In order to select defective modules quickly in this inspection process 54, each module is subjected to a BER measurement at S/X=B(dB) as shown in step 62 in FIG. 6 in the extrapolated operation means (APC) 14.

As described above, a BER inspection, etc. can also be performed in the inspection process 54 for the whole light transmission system in which the optic transmission modules employed as the transmitter 20 and the receiver 31 are connected to each other with a long distance fiber line 23 via a light coupler respectively. In this case, if the light transmission system is determined to be defective, it must be clarified which optic transmission module is defective, the transmitter 20 or the receiver 31.

The results of the BER inspection, etc. carried out in the inspection process 54, then output from the extrapolated operation means (APC) 14 are fed back to the processes for adjusting the received power sensitivity (a current amplifying rate of the photoelectric diode 24, threshold level b of the regenerator 26, etc.) and reassembling parts, etc., which are provided in a preceding stage of the module manufacturing process 52 and the adjusting process 53 in the BER character defect mode, thereby manufacturing and adjusting conditions for modules in the module manufacturing process 52 and the adjusting process 53 are controlled appropriately so as to manufacture those high quality optic transmission modules at a high yield.

If an optic transmission module decided to be defective in the inspection process 54 can be restored to a non-defective one, it is returned to the adjusting process 53 to be adjusted again. If an optic transmission module decided to be defective in the inspection process 54 can be restored to a non-defective one by replacing some parts, etc., it is returned to the module manufacturing process 52 to be restored.

According to the present invention, therefore, because a signal light (S) from a transmitter of an information communication system that is getting faster and faster in operation and larger and larger in capacity is mixed with an interference light (X) that functions as a disturbance component at a proper ratio of power there-between, and this mixed light is received at the receiver so as to measure a bit error rate (BER) and generate a BER character automatically through a simple operation in an extrapolated operation means when the interference light is eliminated (S/X=∞), it is possible to inspect a low bit error rate (BER) of $10^{-12}$ or under accurately, easily, and quickly according to the fluctuations of the ambient temperature and the power supply. As a result, the present invention can obtain an effect that it is possible to realize a high reliability for the optical communication system having been required to become faster and faster in operation and larger and larger in capacity (for example, 10 Gbits/sec, 40 Gbits/sec, etc., which are over the current standard of 2.4 Gbits/sec).

Concretely, according to the present invention, a proper S/X value enables a practical BER character to be obtained appropriately to a trend of necessary accuracy and measuring time. Consequently, the present invention can assure a high reliability for optical communication systems (light transmission systems) having been required to cope with information communication systems that are getting faster and faster in operation and larger and larger in capacity.

According to the present invention, it is possible to inspect a bad floor character, etc., as well as make a quick decision for OK/NG of the minimum received power sensitivity by checking the slope of a character and comparing it with a reference character in the BER curve generation process.

Furthermore, according to the present invention, modules can be adjusted again (adjustment of a threshold voltage, adjustment of a photoelectric current increment rate, etc. of a photoelectric diode) in the adjusting process, as well as restored in the module manufacturing process, thereby modules can be manufactured efficiently.

Furthermore, according to the present invention, results of BER inspection, etc. are fed back to the module manufacturing process and the adjusting process so as to control manufacturing and adjusting conditions of modules properly, thereby improving the yield for manufacturing high quality optic transmission modules. Consequently, the present invention can assure a high reliability for light transmission systems having been required to cope with information communication systems that are getting faster and faster in operation and larger and larger in capacity.

What is claimed is:

1. A method for manufacturing an optic transmission module, comprising the processes of:

(A) manufacturing an optic transmission module employed for a light transmission system; and (B) inspecting said optic transmission module manufactured in said manufacturing process for a character of a bit error rate using a bit error rate specific inspection system; wherein said bit error rate specific inspection system includes;
signal light transmitting means for generating a light signal according to an electrical signal pattern;
interference light transmitting means for generating an interference light according to a disturbance signal having a rectangular pulse waveform;
a light coupler for mixing said signal light received from said signal light transmitting means optically with said interference light received from said interference light transmitting means;
optical means for changing an optical power of said mixed light received from said light coupler;
receiving means for converting said mixed light received from said optical means to an electrical signal so as to be identified and regenerated; and
calculating means for measuring a bit error rate of said mixed signal regenerated by said receiving means corresponding to said optical power of said mixed light changed by said optical means, thereby calculating a calculated character of a bit error rate of a signal light to its optical power according to this measured bit error rate corresponded to said change of said optical power of said mixed light, and extrapolating a theoretical character of a bit error rate when no interference light is detected on the basis of the calculated character of said bit error rate of said signal light to its optical power so as to be inspected, wherein the theoretical character of said bit error rate in said calculating means of said bit error rate specific inspection system is obtained on the basis of degradation quantity D of a signal-noise ratio (S/N) obtained with addition of an interference light.

2. A method for manufacturing an optic transmission module, comprising the processes of:

(A) manufacturing an optic transmission module employed for a light transmission system; and (B) inspecting a character of a bit error rate of said optic transmission module manufactured in said manufacturing process using a bit error rate specific inspection system; wherein said bit error rate specific inspection system includes;
signal light transmitting means for generating a light signal according to an electrical signal pattern;
interference light transmitting means for generating an interference light according to a disturbance signal having a rectangular pulse waveform;
a light coupler for mixing said signal light received from said signal light transmitting means optically with said interference light received from said interference light transmitting means;
optical means for setting an optical power ratio (S/X) of an optical power of said signal light to an optical power of said interference light mixed by said light coupler to a predetermined value so as to change an optical power of said mixed light;
receiving means for converting said mixed light received from said optical means to an electrical signal so as to be identified and regenerated; and
calculating means for measuring a bit error rate of said mixed signal regenerated by said receiving means corresponding to a change of said optical power of said mixed light at said optical power ratio (S/X) set by said optical means, thereby calculating a calculated character of a bit error rate of a signal light to its optical power at said optical power ratio (S/X) according to this measured bit error rate corresponded to said change of said optical power of said mixed light at a measured optical power ratio (S/X), then extrapolating a theoretical character of a bit error rate when no interference light is detected on the basis of the calculated character of said bit error rate of said signal light to its optical power at the measured optical power ratio (S/X) so as to be inspected, wherein the theoretical character of said bit error rate in said calculating means of said bit error rate specific inspection system is obtained on the basis of degradation quantity D of a signal-noise ratio (S/N) obtained with addition of an interference light.

3. A method for manufacturing an optic transmission module according to claim 1 or 2; wherein a character of a bit error rate of $10^{-13}$ or under is inspected in said inspecting process.

4. A method for manufacturing an optic transmission module, comprising the processes of:

(A) manufacturing an optic transmission module provided with a transmitter and a receiver and employed for a light transmission system; and (B) inspecting said optic transmission module manufactured in said manufacturing process for a bit error rate; wherein said inspection process is conducted such that said transmitter receives a pattern signal and outputs a signal light, which is then mixed with a pulse-like interference light into a light signal, then said receiver receives said mixed light signal and outputs an output signal, which is then measured, thereby calculating a bit error rate of said measured output signal to said pattern signal inputted to said transmitter and from said calculated bit error rate calculating a theoretical bit error rate of an output signal from said receiver when said interference light is eliminated from said pattern signal inputted to said transmitter, wherein a pulse frequency of said pulse-like interference light is smaller than that of a signal of said light signal output from said transmitter.

5. A method for manufacturing an optic transmission module according to claim 4; wherein said receiver is a standard master module or a known module and both of said measured bit error rate and said calculated bit error rate are employed for a bit error rate of said transmitter in said inspection process.

6. A method for manufacturing an optic transmission module according to claim 4; wherein said transmitter is a standard master module or a known module and both of said measured bit error rate and said calculated bit error rate are employed for a bit error rate of said receiver in said inspection process.

7. A method for manufacturing an optic transmission module, comprising the processes of:

(A) manufacturing an optic transmission module employed for a light transmission system; and (B) inspecting said optic transmission module for a bit error rate; wherein said inspecting process makes it possible that;
a pattern signal is entered to a transmitter of said optic transmission module;
a signal light output from said transmitter according to an input of said pattern signal is mixed with a pulse-like interference light having a frequency smaller than a signal frequency of said signal light to obtain mixed light;
said mixed light is entered to a receiver of said optic transmission module via an optical fiber;
an output signal from said receiver that has received said mixed light is measured, thereby finding a bit error rate of a pattern of said output signal from said receiver to said pattern signal, then extrapolating a theoretical bit error rate of an output signal from said receiver to a pattern signal entered to said transmitter when said interference light is eliminated from said optic transmission module.

8. A method for manufacturing an optic transmission module according to any of claim 1, 2, 4 or 7; wherein said method further includes a process of:
feeding back information related to a bit error rate of a pattern inspected in said inspection process to said manufacturing process.

9. A method for inspecting a character of a bit error rate, comprising the steps of:
- (A) entering a signal pattern to a transmitter of an optic transmission module, thereby generating a light signal from said transmitter;
- (B) generating a digital light signal whose frequency is lower than that of said light signal;
- (C) mixing said light signal with said digital light signal into a mixed light signal;
- (D) entering said mixed light signal to a receiver, thereby outputting a received signal from said receiver;
- (E) finding a measured bit error rate of a received signal pattern of said received signal to said signal pattern entered to said transmitter; and
- (F) extrapolating a theoretical bit error rate of the received signal pattern to said signal pattern entered to said transmitter according to said measured bit error rate when said digital light signal is not mixed.

10. A bit error rate specific inspection system employed for a light transmission system and composed so as to inspect an inspection object for a character of a bit error rate, comprising:
- signal light transmitting means for generating a light signal according to an electrical signal pattern;
- interference light transmitting means for generating an interference light according to a disturbance signal having a rectangular pulse waveform;
- a light coupler for mixing said light signal received from said signal light transmitting means with said interference light received from said interference light transmitting means, to obtain a mixed light;
- optical means for changing an optical power of said mixed light received from said light coupler;
- receiving means for converting said mixed light received from said optical means to an electrical signal so as to be identified and regenerated; and
- calculating means for measuring a measured bit error rate of said mixed signal regenerated by said receiving means corresponding to said optical power of said mixed light changed by said optical means, thereby calculating a measured character of a bit error rate of a signal light to its optical power according to this measured bit error rate corresponded to said change of said optical power of said mixed light, then extrapolating a theoretical character of a bit error rate when no interference light is detected on the basis of the measured character of said bit error rate of said signal light to its optical power so as to be inspected,
- wherein the theoretical character of said bit error rate is obtained in said calculating means on the basis of degradation quantity D of a signal-noise ratio (S/N) obtained with addition of an interference light.

11. A bit error rate specific inspection system employed for a light transmission system and composed so as to inspect an inspection object for a character of a bit error rate, comprising:
- signal light transmitting means for generating a light signal according to an electrical signal pattern;
- interference light transmitting means for generating an interference light according to a disturbance signal having a rectangular pulse waveform;
- a light coupler for mixing said light signal received from said signal light transmitting means optically with said interference light received from said interference light transmitting means, to obtain a mixed signal;
- optical means for setting an optical power ratio (S/X) of an optical power of said light signal to an optical power of said interference light as mixed by said light coupler to a predetermined value so as to change an optical power of said mixed light;
- receiving means for converting said mixed light received from said optical means to an electrical signal so as to be identified and regenerated; and
- calculating means for measuring a measured bit error rate of said mixed signal regenerated by said receiving means corresponding to a change of said optical power of said mixed light at said optical power ratio (S/X) set by said optical means, thereby calculating a measured character of a bit error rate of a light signal to its optical power at said optical power ratio (S/X) according to this measured bit error rate, then extrapolating a theoretical character of a bit error rate when no interference light is detected on the basis of the measured character of said bit error rate of said signal light to its optical power at this calculated optical power ratio (S/X) so as to be inspected,
- wherein the theoretical character of said bit error rate is obtained in said calculating means on the basis of degradation quantity D of a signal-noise ratio (S/N) obtained with addition of an interference light.

12. A bit error rate specific inspection system according to claim 10 or 11; wherein
- a character of a bit error rate of 1013 or under is inspected in said calculating process.

13. A bit error rate specific inspection system according to claim 10 or 11; wherein
- a theoretical character of said bit error rate is obtained on the basis of degradation quantity D of a signal-noise ratio (S/N) obtained with addition of an interference light.

14. A bit error rate specific inspection system for inspecting a bit error rate of an optic transmission module employed for a light transmission system, comprising:
- pattern signal generating means for generating a pattern signal of said optic transmission module;
- transmitting means for receiving said pattern signal generated in said pattern signal generating means, thereby generating a first light signal;
- pulse-like signal generating means for generating a pulse-like signal;
- signal converting means for generating a second light signal from said pulse-like signal generated in said pulse-like signal generating means;
- light mixing means for mixing said first light signal with said second light signal, thereby outputting a mixed light;
- receiving means for receiving said mixed light output from said light mixing means; and
- calculating means for receiving a pattern signal generated in said pattern signal generating means and a received pattern signal output from said receiving means, thereby finding a measured bit error rate of said received pattern output from said receiving means to a pattern signal received by said transmitting means, and extrapolating a theoretical bit error rate of a pattern signal of an output signal from said receiver to said pattern signal received by said transmitting means according to said measured error bit rate when said interference light is eliminated from said transmitting means.

15. A bit error rate specific inspection system according to claim 14; wherein said receiving means is a standard master module a known module and both of said measured bit error rate and said theoretical bit error rate are employed for a bit error rate of said transmitter in said inspection process.

16. A bit error rate specific inspection system according to claim 14; wherein said receiving means is a standard master module a known module and both of said measured bit error rate and said theoretical bit error rate are employed for a bit error rate of said receiver in said inspection process.

* * * * *